United States Patent
Courtes

(10) Patent No.: US 9,885,272 B2
(45) Date of Patent: Feb. 6, 2018

(54) ACOUSTIC ENERGY COOLING SOURCE

(71) Applicant: SDMO INDUSTRIES, Brest (FR)

(72) Inventor: Luc Courtes, Saint-Pabu (FR)

(73) Assignee: SDMO INDUSTRIES, Brest (FR)

( * ) Notice: Subject to any disclaimer, the term of this patent is extended or adjusted under 35 U.S.C. 154(b) by 0 days.

(21) Appl. No.: 14/970,156

(22) Filed: Dec. 15, 2015

(65) Prior Publication Data
US 2016/0177802 A1 Jun. 23, 2016

(30) Foreign Application Priority Data

Dec. 17, 2014 (FR) .................................... 14 62661
Jul. 30, 2015 (FR) .................................... 15 57309

(51) Int. Cl.
| | |
|---|---|
| *F01N 3/00* | (2006.01) |
| *F01N 5/02* | (2006.01) |
| *F01P 1/06* | (2006.01) |
| *F01P 3/20* | (2006.01) |
| *F25B 9/14* | (2006.01) |

(52) U.S. Cl.
CPC .................. *F01N 5/02* (2013.01); *F01P 1/06* (2013.01); *F01P 3/20* (2013.01); *F02G 2243/54* (2013.01); *F25B 9/145* (2013.01); *F25B 2309/1403* (2013.01); *Y02T 10/16* (2013.01)

(58) Field of Classification Search
USPC ......... 60/272, 275, 298, 320, 517, 520, 521, 60/522, 526, 721
See application file for complete search history.

(56) References Cited

U.S. PATENT DOCUMENTS

| | | | | |
|---|---|---|---|---|
| 6,732,515 | B1 * | 5/2004 | Weiland | F02G 1/0435 60/520 |
| 9,163,581 | B2 * | 10/2015 | Dyson, Jr. | F02G 1/04 |
| 2002/0043065 | A1 * | 4/2002 | Ban | F02G 5/02 60/320 |
| 2006/0119224 | A1 * | 6/2006 | Keolian | H02N 2/18 310/339 |
| 2008/0060364 | A1 | 3/2008 | Watanabe et al. | |
| 2010/0001535 | A1 * | 1/2010 | Kimura | F01N 13/0093 290/1 A |
| 2011/0259000 | A1 * | 10/2011 | Nakamura | F02G 1/04 60/517 |
| 2011/0259003 | A1 | 10/2011 | Yamamoto | |

FOREIGN PATENT DOCUMENTS

| | | |
|---|---|---|
| CN | 101608847 A | 12/2009 |
| JP | 2005233485 A | 9/2005 |

OTHER PUBLICATIONS

French Search Report and English translation of the Written Opinion for corresponding French Patent Application No. 1462661, filed Jul. 30, 2015.

* cited by examiner

*Primary Examiner* — Binh Q Tran
(74) *Attorney, Agent, or Firm* — David D. Brush; Westman Champlin & Koehler, P.A.

(57) ABSTRACT

An apparatus includes an exhaust system, a cooling system, and two or more thermoacoustic devices. A first thermoacoustic device is configured to convert heat energy from the exhaust system to amplify an acoustic wave. A second thermoacoustic device configured to convert energy in the amplified acoustic wave to an input for the cooling system. The apparatus may be incorporated or in communication with an engine or a generator.

14 Claims, 14 Drawing Sheets

US 9,885,272 B2

ACOUSTIC ENERGY COOLING SOURCE

CROSS-REFERENCE TO RELATED APPLICATIONS

This Application claims priority from and the benefit of French Patent Application No. FR 1462661, filed Dec. 17, 2014, and French Patent Application No. FR 1557309, filed Jul. 30, 2015, the contents of which are incorporated herein by reference in their entireties.

TECHNICAL FIELD

This disclosure relates in general to an acoustic energy cooling source, and in some examples, an acoustic energy cooling in a path between an exhaust system and an intake system of an engine or generator.

BACKGROUND

A generator or a genset, may include a drive system, such as an engine or a turbine, and an alternator or another device for generating electrical energy or power. One or more generators may provide power to a load through a generator bus and circuit breakers or other types of switches. A generator system including two or more generators may be connected to a generator bus and to other generators through circuit breakers. Each generator may include a local generator controller that manages the circuit breakers and paralleling operations with the other generators.

The input to the generator set is fuel and air. The primary output is electricity, and secondary outputs include exhaust gas and heat. The air and fuel combust to form heated exhaust gas including combustion byproducts such as water vapor, carbon dioxide, and nitrogen. To maximize the efficiency of the generator set, the engine is cooled from a variety of techniques. However, the cooling system requires energy from another source. However, when cold water is not abundant, challenges remain in providing efficient and effective mechanisms for cooling the engine and generator.

BRIEF DESCRIPTION OF THE DRAWINGS

Exemplary implementations are described herein with reference to the following drawings.

DETAILED DESCRIPTION

A cooling system for a generator or engine may cool the intake air flowing into the cylinders of the engine. The drive system may also be cooled to maintain critical temperatures for the drive system components and the oil or lubricants that coat the drive system's moving components (e.g., pistons) and reduce friction. Example mechanisms for cooling the drive system include radiators, which may be air cooled or liquid cooled. The liquid, or engine coolant, may be water, especially when cold water is abundant (e.g., marine applications near a body of water). Alternatively, a water cooling system may recirculate water through the cooling system. The water may be cooled by the atmosphere or another source, warmed by the drive system, and the process is repeated.

The following embodiments utilize thermoacoustic devices to convey energy for the cooling system using a longitudinal acoustic wave to facilitate interaction between temperature, density, and pressure variations. Sound is pressure variation and oscillating motion of a medium (e.g., air, gas, liquid, or solid). The sounds may be caused by temperature (e.g., heat). The heat is transferred to sound, and the sound may be transferred to motion or another form of energy to generate a cooling energy.

The following embodiments provide systems and methods for harness the energy in the exhaust of a drive system as heat to drive a thermoacoustic system that converts energy to provide an input for the drive system's cooling system or the air intake of the engine.

Figure 1:
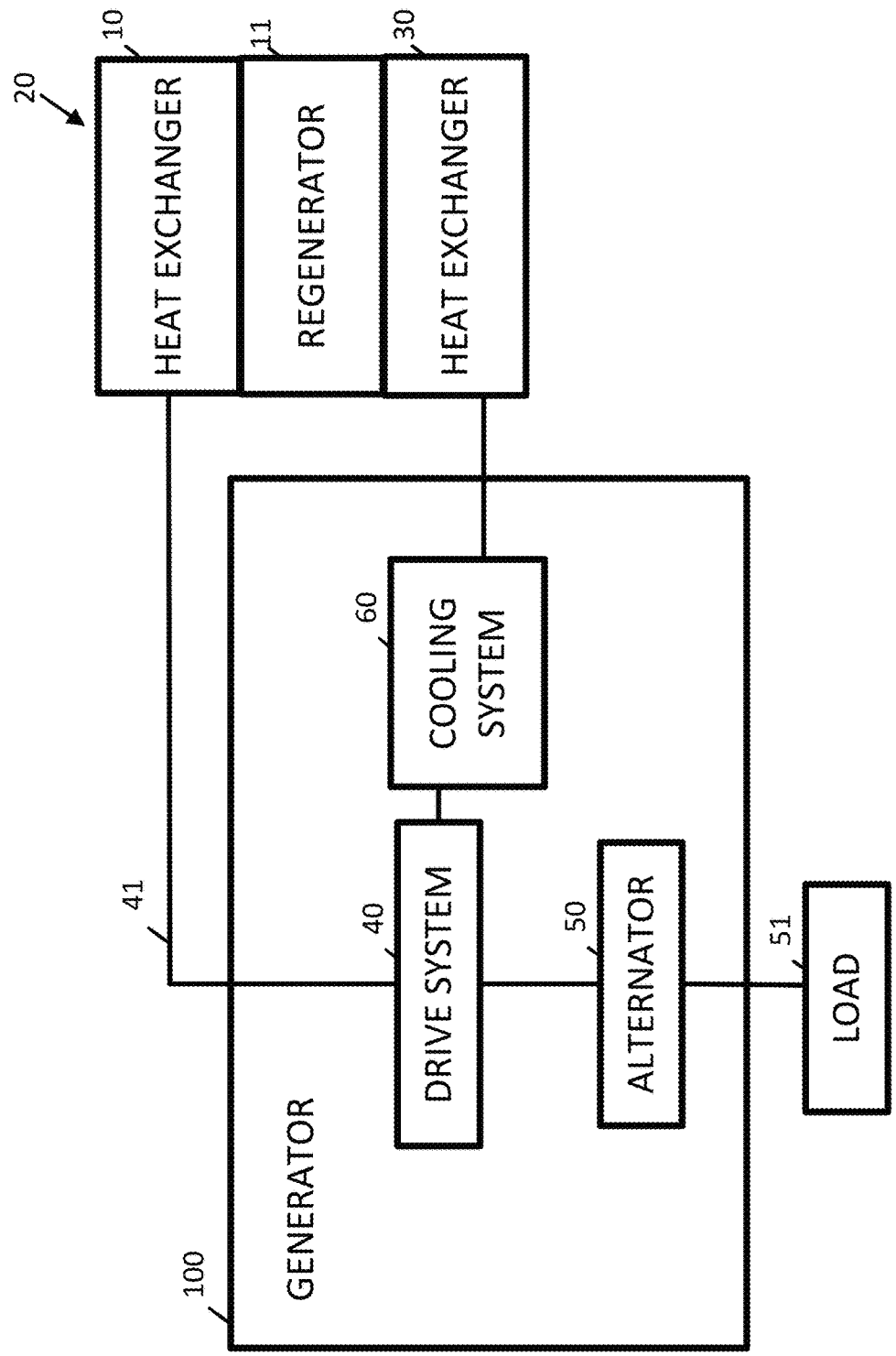
FIG. 1 illustrates an example energy conversion system for a generator.

FIG. 1 illustrates an example energy conversion system for a generator 100. The energy conversion system includes the thermoacoustic system 20 including heat exchanger 10, a regenerator 11, and a heat exchanger 30. The generator 100 includes a drive system 40, an alternator 50, and a cooling system 60. The drive system 40 turns a prime mover of the alternator 50, which converts mechanical energy to electrical energy to supply electricity to the load 51. Additional, different, or fewer components may be included.

The drive system 40 for mechanical electrical conversion may be an internal combustion engine or a turbine. The turbine may include a rotor with symmetric blades. A moving fluid acts on the symmetric blades to impart rotational energy on a rotor or shaft. In the internal combustion engine a combustion of fuel in the engine applies a force to one or more pistons that rotates a shaft. In either example, the rotational force turns the alternator 50, which converts mechanical energy to electrical energy to supply electricity to the load 51.

In addition to producing mechanical energy for the alternator 50, the drive system 40 produces exhaust. The exhaust includes heat. The exhaust leaves the drive system 40 through an exhaust pipe 41. Example temperatures for the exhaust may be 200 to 600 degrees Celsius. The temperature of the exhaust may dependent on the fuel of the drive system 40. Example fuels include gasoline, kerosene, diesel fuel, liquefied petroleum gas (LPG), or gaseous fuels such as hydrogen gas, natural gas, biogas, or another gas.

The regenerator 11 may be a thermal storage medium sandwiched between the heat exchanger 10 and the heat exchanger 30. The role of the heat exchangers is to either add heat to the working gas of the thermoacoustic system 20, which is the case of a hot heat exchanger such as heat exchanger 10, or to remove heat from the working gas, which is the case of a cold heat exchanger such as heat exchanger 30.

In the thermoacoustic system 20 (thermoacoustic cell), the acoustic wave can be induced by the gradient of temperature on the regenerator 11, which is due to a temperature difference between two heat exchangers 10 and 30. When there is already an acoustic wave induced or imposed to the regenerator 11, the acoustic wave may be amplified within the regenerator 11.

The heat exchangers 10 and 30 may be designed to add or remove heat to or from the working gas. The heat exchangers 10 and 30, through the cooling system 60, may remove heat from or cool the air that is admitted in the engine cylinders. The percentage at which the heat is added or removed describes the efficiency of the heat exchanger.

Figure 2:
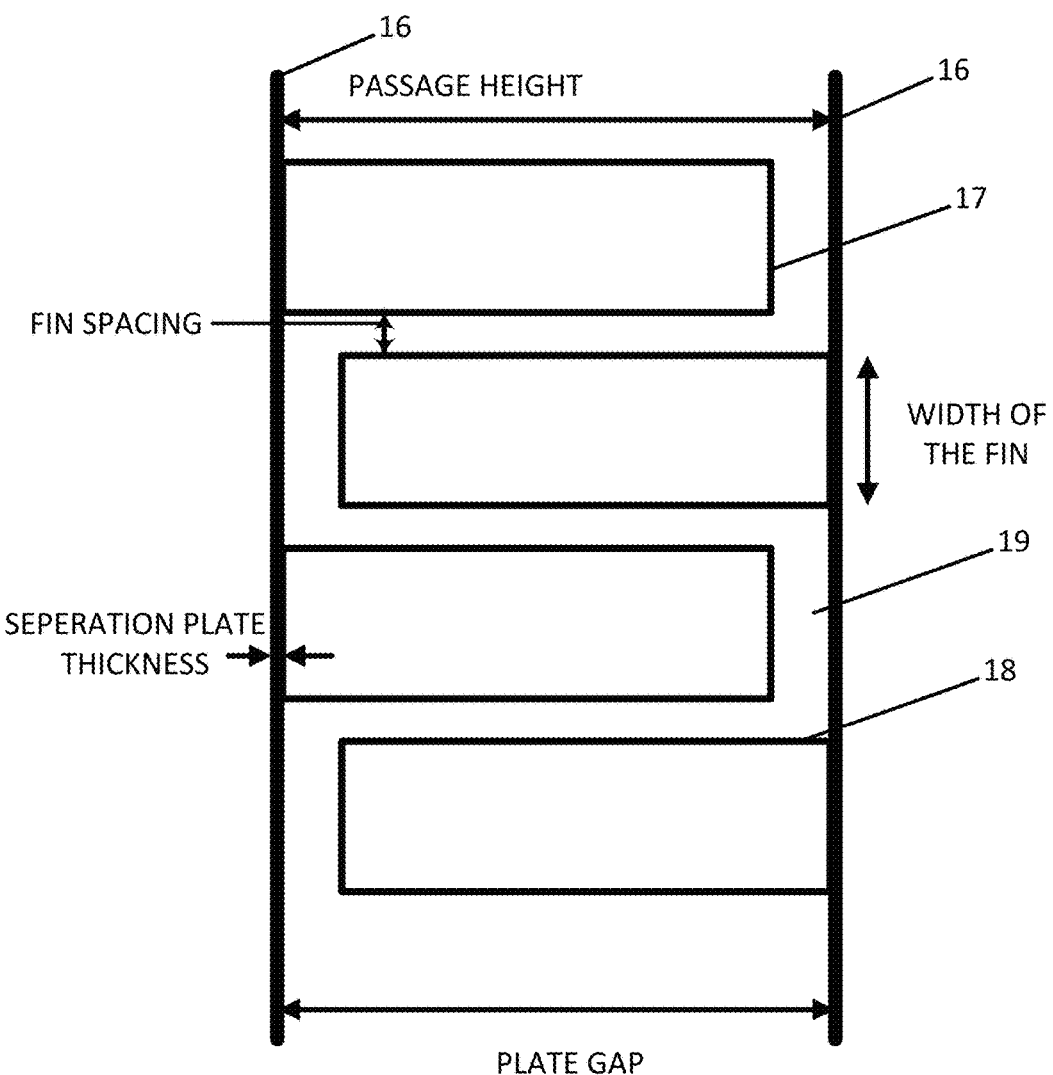
FIG. 2 illustrates an example highly efficient heat exchanger.

FIG. 2 illustrates one highly efficient heat exchanger, the "multichannel type2" heat exchanger. The heat exchanger includes two plates 16 that are spaced apart by the plate gap to form the housing of the heat exchanger. The plates 16 support multiple plates 17. The working fluid oscillates within the passage 19 formed from by the fin spacing and the plate gap, as illustrated in FIG. 2. The fins have a thickness into the page, which is not illustrated. The plates 16 may have a thickness sufficient to hold a fluid to add or remove heat from/to the solid surface of the heat exchanger.

The heat exchanger 10 transfers the heat in the exhaust to the thermoacoustic system 20. In a first thermoacoustic process, the thermoacoustic system 20 amplifies an acoustic wave from the energy in the heat. In a second thermoacoustic process, the amplified acoustic wave drives a heat pump to remove heat and cause refrigeration. The refrigeration or lack of heat is transferred by the heat exchanger 30 to the cooling system 60.

Figure 3:
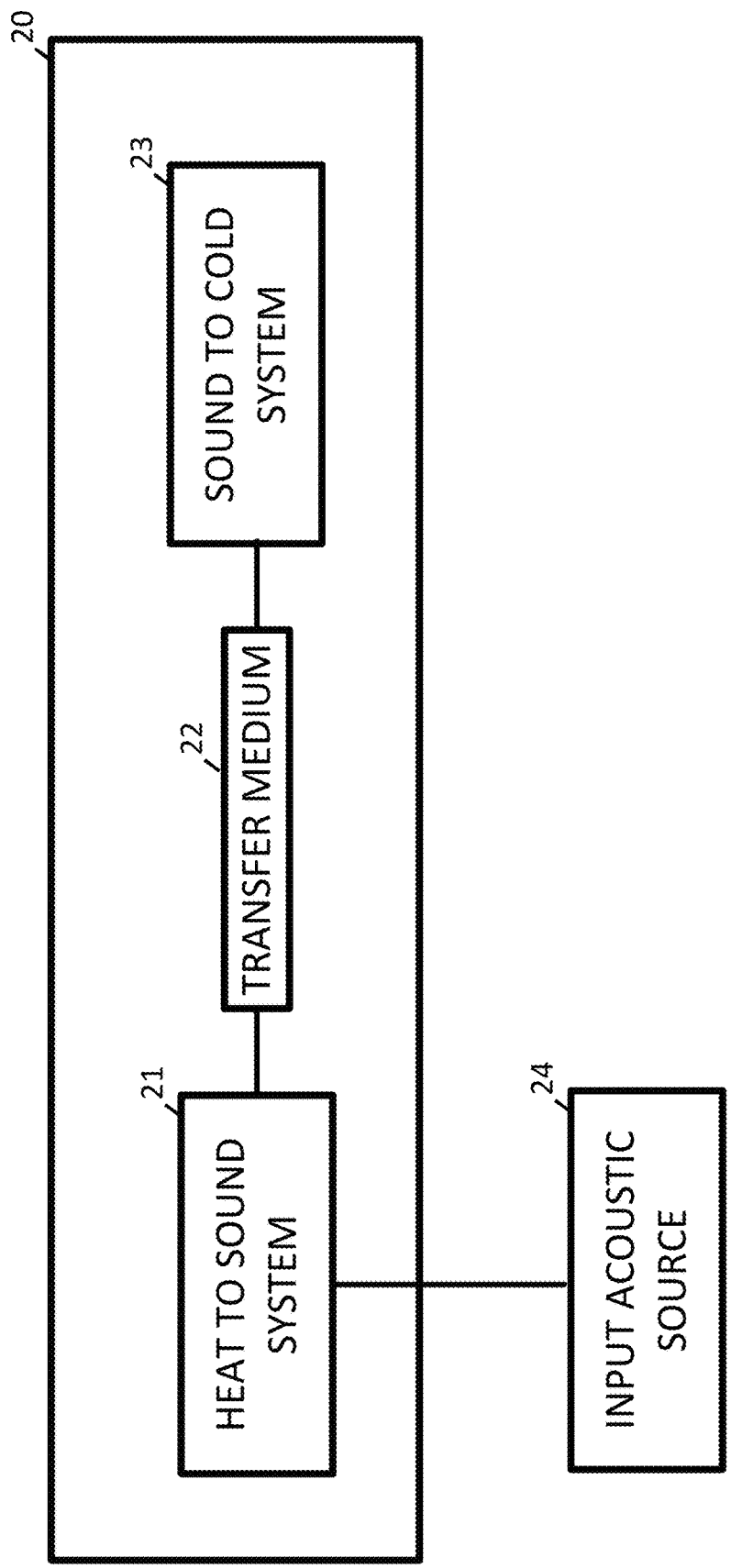
FIG. 3 illustrates an example thermoacoustic system.

FIG. 3 illustrates the thermoacoustic system 20 including a heat to sound system 21 (first thermoacoustic device), a transfer medium 22 (e.g., regenerator 11), and a sound to cold system 23 (second thermoacoustic device). The heat to sound system 21 may receive an input signal input acoustic source 24. The input signal may be sound generated by an electroacoustic generator. The electroacoustic generator may be piezoelectric. An example input signal may have a low frequency signal (e.g., less than 100 Hertz). The heat to sound system 21 may include a thermoacoustic cell, and the sound to cold system 23 may include another thermoacoustic cell.

Figure 4:
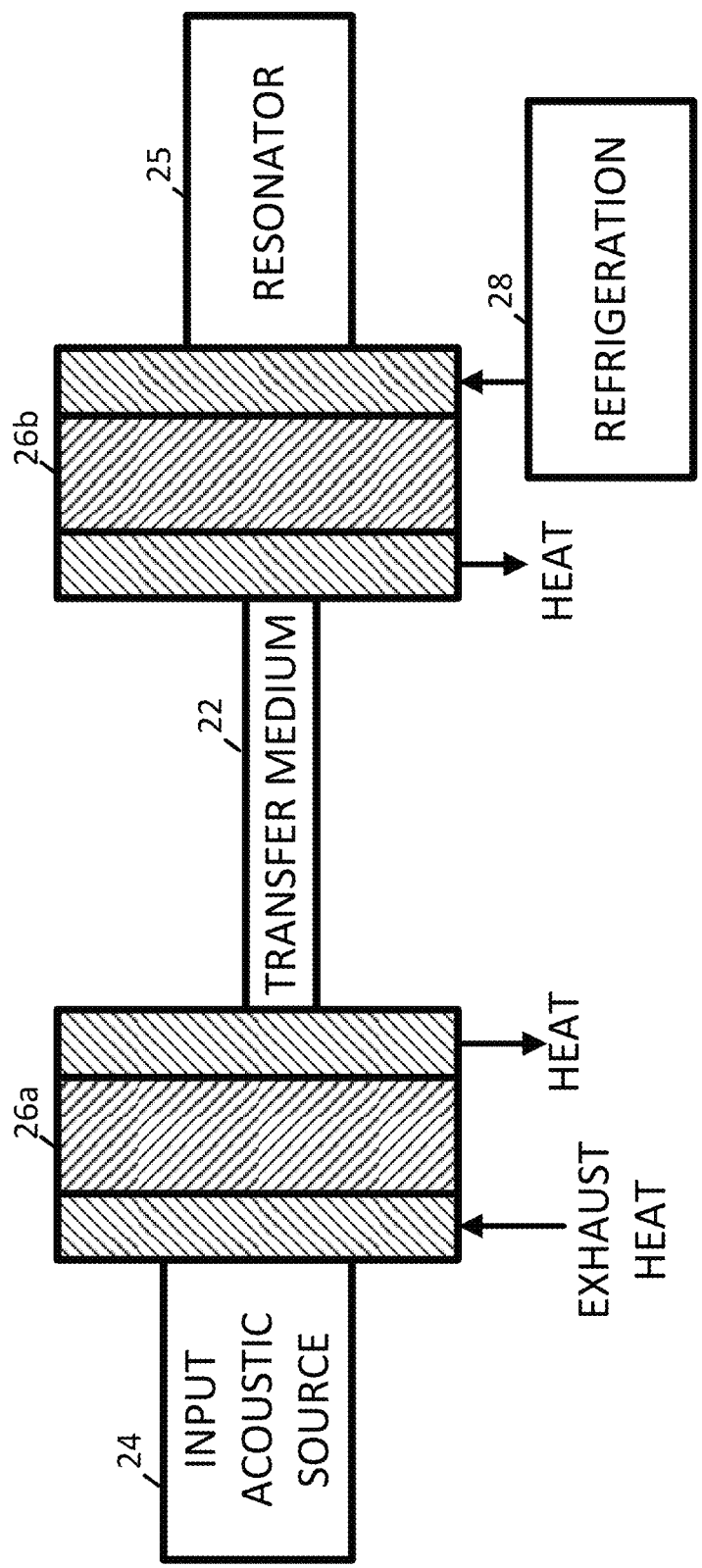
FIG. 4 illustrates another example thermoacoustic system.

FIG. 4 illustrates the thermoacoustic system 20 including a first thermoacoustic cell 26a and a second thermoacoustic cell 26b. Each thermoacoustic cell may include a heat exchanger on each side of a stack. The stack is a solid material with pores that allow a gas fluid to oscillate while in contact with the solid material. The stack may be formed of multiple layers or rows of the material spaced closely together. The material of the stack may be selected to have a low thermal conductivity and a heat capacity must larger than the heat capacity of the oscillating gas so that the temperature of the stack is stable. Example materials for the stack include various polymers, resins, ceramics, and polyethylene terephthalate.

Depending on the thermal diffusivity of the gas, heat is diffused through the gas. In other words the stack facilitates oscillation of the gas from sound to be transferred to heat. Likewise, the introduction of heat into the thermoacoustic cell increases the oscillation of the gas and amplifies the sound. Both principles are shown in the thermoacoustic system 20.

The heat from the exhaust is introduced into the first thermoacoustic cell 26a. The energy from the heat amplifies the small acoustic wave signal from input acoustic source 24 to a larger acoustic wave signal that travels through the transfer medium 22 to the second thermoacoustic cell 26b. Some heat may be lost by an optional heat exchanger downstream of the stack of the first thermoacoustic cell 26a.

The larger acoustic wave signal travels through the transfer medium 22. The transfer medium 22 may include a solid, liquid, or gas. In one example, the medium of the transfer medium 22 is a noble gas such as helium. The acoustic wave signal may have a power on the order of 1-100 kilowatts (kW), for example 10 kW. The larger acoustic wave signal may be attenuated minimally by the transfer medium 22.

When the larger acoustic wave signal arrives at the second thermoacoustic cell 26b, some heat may be initially lost at the optional heat exchanger upstream of the stack of the second thermoacoustic cell 26b. The larger acoustic wave signal oscillates the gas in the stack of the second thermoacoustic cell 26b causing an inward heat flow. Heat flows from the refrigeration unit 26 into the second thermoacoustic cell 26b.

The optional resonator 25 allows a standing wave to be defined for the thermoacoustic system 20. The resonant frequency of the resonator 25 depends on the dimensional of the tube or chamber. The frequency of the input acoustic source 24 and the material and dimensions of the transfer medium 22 may be selected based on the resonant frequency of the resonator 25.

The temperature of the refrigeration unit 26 is lowered by the heat exchanger downstream of the stack of the second thermoacoustic cell 26b. Heat is pumped out of the refrigeration unit 28 into the heat exchanger. The refrigeration unit 28 may cool water or another coolant for the drive system 40.

Figure 5:
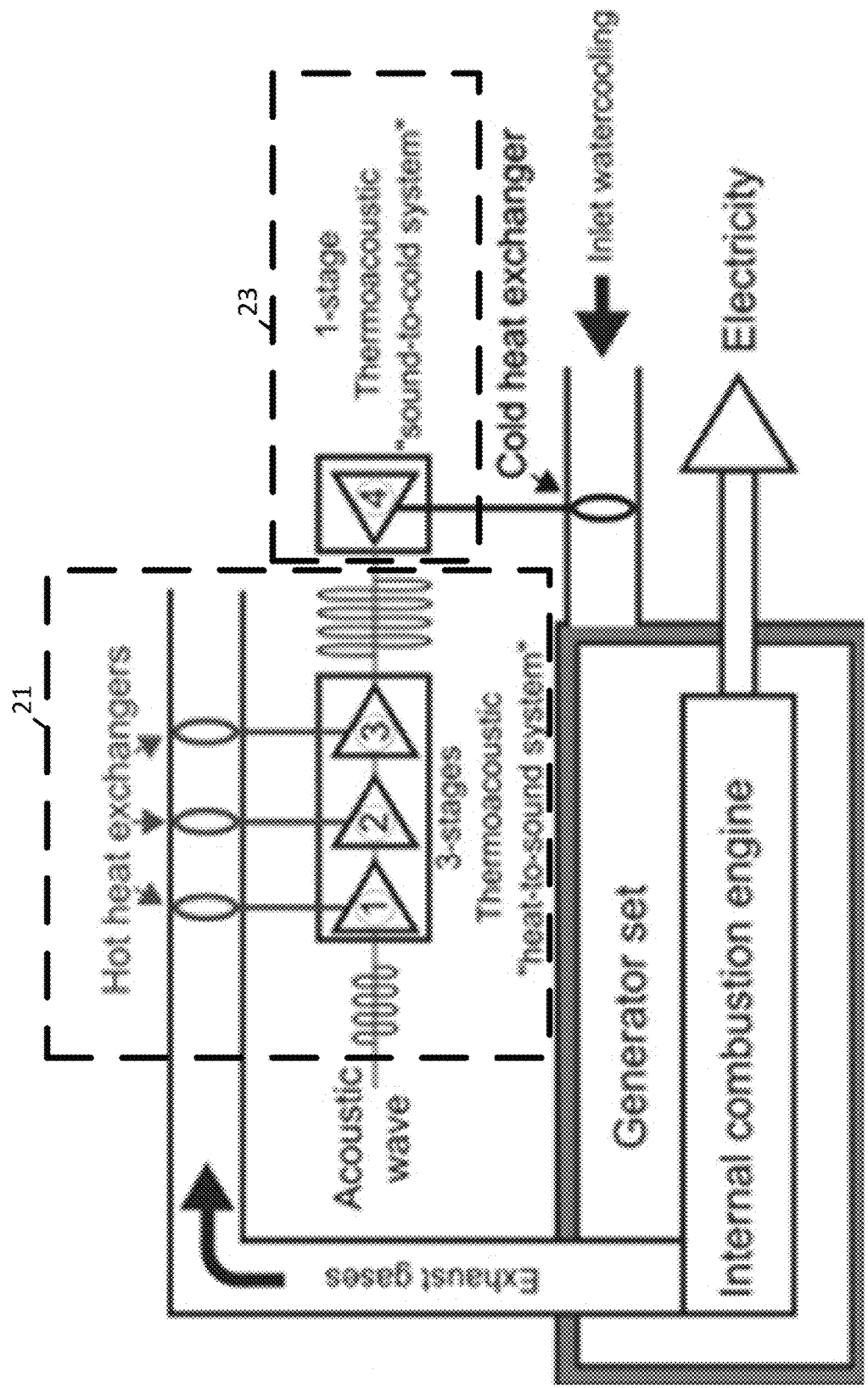
FIG. 5 illustrates another example of an engine and thermoacoustic system.

FIG. 5 is another example of an engine and thermoacoustic system. In this example, the heat to sound system 21 may include multiple thermoacoustic stages. Each thermoacoustic stage may include a stack with adjacent heat exchangers, as described above. Each stage may have a diminishing effect in terms of efficiency. For example, the efficiency of the first stage is greater than the efficiency of the second stage, and so on. However, the aggregate efficiency increases as the number of stages increases. In addition, each thermoacoustic stage may be coupled to an exhaust heat exchanger or radiator that transfers heat from the exhaust gas or pipe to the respective thermoacoustic stage. The multiple thermoacoustic stages may be housed in the same enclosure. An example size for the enclosure may be a cylinder have a height of 40 to 100 cm (e.g., 60 cm) and a diameter of 40-100 cm (e.g., 60 cm). An example number of stages is three, as illustrates by FIG. 5. An example pressure change between the input to the first stage and the output of the final stage may be 40 bars. An example power change between the input to the first stage ant the output of the final stage may be 20-40 kW.

The inputs to the heat to sound system 21 are heat from the exhaust and an acoustic wave with a nominal power level. The output of the heat to sound system 21 is the amplified acoustic wave sent to the sound to cold system 23. The sound to cold system, while illustrated with a single stage, may also include multiple thermoacoustic stages. Each thermoacoustic stage may include a stack with adjacent heat exchangers, as described above. The enclosure of the sound to cold system may be a cylinder of 20-40 cm in height and having a diameter of 40-100 cm (e.g., 60 cm). The output of the sound to cold system 23 cools the inlet water for the internal combustion engine. Stated another way, the sound to cold system 23 pumps heat to itself, cooling the inlet liquid or water through the heat exchanger or radiator.

Figure 6A:
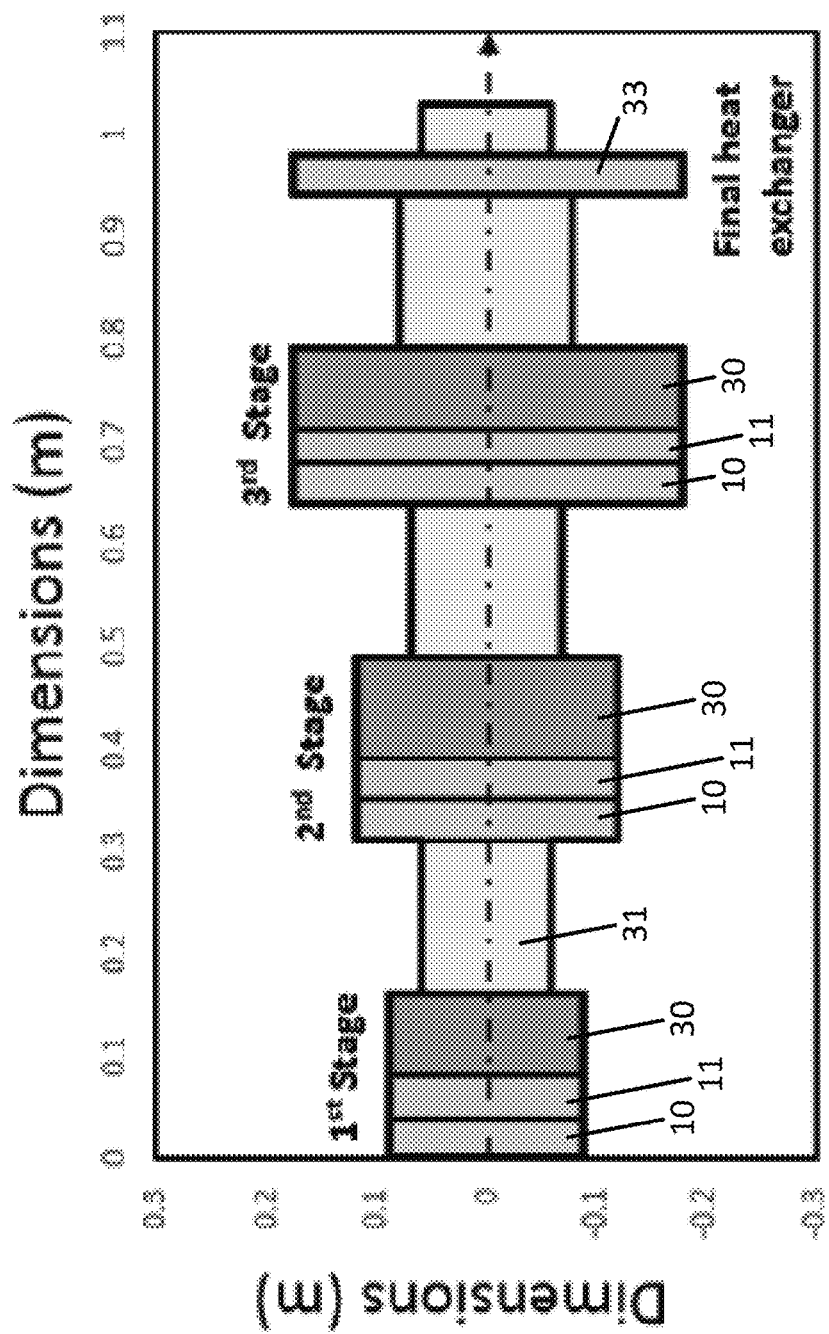
FIG. 6A illustrates an example three state thermoacoustic system.

FIG. 6A illustrates an example three state thermoacoustic system. Each of the first stage, the second stage, and the third stage includes a cold heat exchanger 10, a regenerator 11, and a hot heat exchanger 30. The thermoacoustic system may be enclosed within an insulated container. The stages are connected by tube 31 that carries the working gas and the acoustic wave. The final heat exchanger 33 prevents heat loses by thermic exchange outside of the insulated container. The three stages of the thermoacoustic system may be selected in order to deliver the maximum of acoustic net power. One stage, two stages, or four or more stages may be used in the thermoacoustic system. The performance of the three stages affects the performance of the drive system 40 and generator 100.

In one example, the thermoacoustic system increases the efficiency of the drive system 40 by 10%, which implies that the thermoacoustic system delivers a net electrical power (P) (e.g., 14 kW). However, because of the efficiency (e) (e.g., 0.8) of the turbine, the thermoacoustic system should work to deliver about P/e power (e.g., 14 kW/0.8=17.5 kW). Table 1 lists examples dimensions and temperatures for the three stages of the thermoacoustic system.

The depth of the heat exchange area, compared with the length of the thermoacoustic system 20, the pressure loss and the speed of the fumes are used to select the design of the stages. There is a compromise between the number of (stages/plates in a stage) and the different geometric and physical constraints. In one example, an area of 600×600 square millimeters ($mm^2$) with single row for the first evaporator, six-row for the second and ten rows for the third. The total depth of three stages may be 600 mm.

Figure 6B:
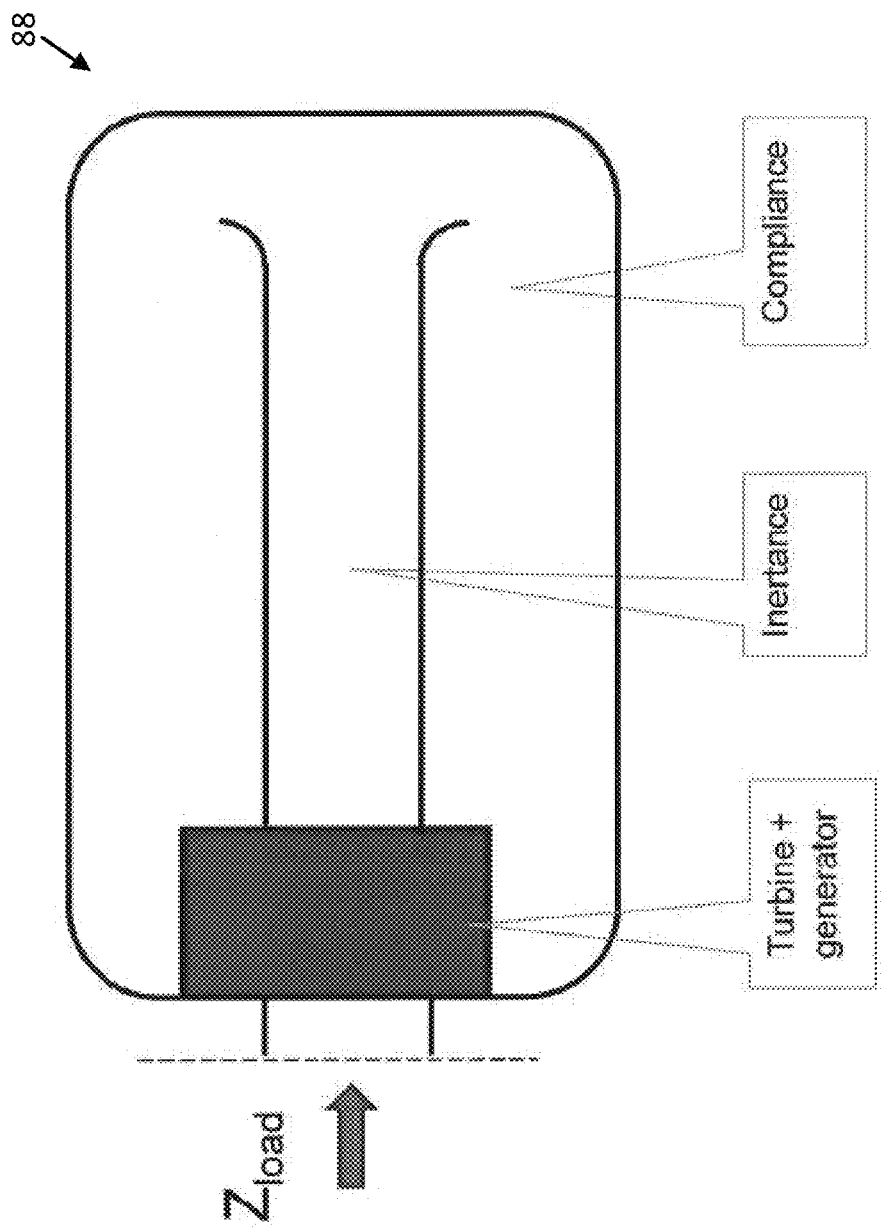
FIG. 6B illustrates an acoustic flow motion, bi-direction turbine.

FIG. 6B illustrates an acoustic flow motion, bi-direction turbine geometry 88. The turbine, which may be a receiving system in fluid communication with any of the feedback systems described below (e.g., FIG. 7B, FIG. 9). The inertance represents a pressure difference in the fluid in order to change a flow rate over time. The compliance represents the resistance or ease that the fluid is compressed. Together the inertance and compliance may produce acoustic oscillations analogous to the electrical oscillations of an inductance and a capacitance in an alternating current electrical circuit.

Figure 7A:
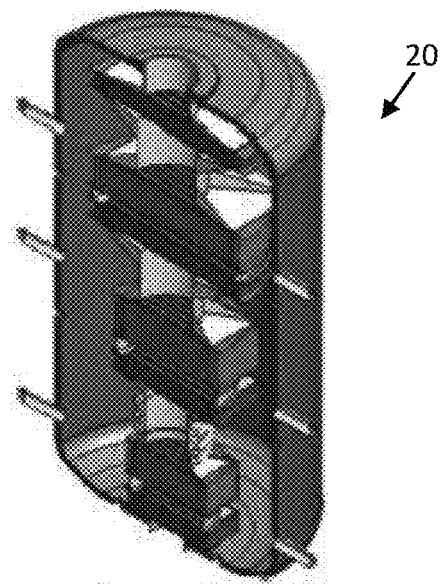
FIG. 7A illustrates a cylindrical thermoacoustic system.

FIG. 7A illustrates a thermoacoustic system 20 that is cylindrical. The first, second, and third stages are arranged

TABLE 1

| | | Type | Square of (m) | Diameter or Equivalent (m) | Porosity | Plate gap (mm) | Fin Spacing (mm) | Hydraulic radius (μm) | Wire Diameter (μm) | Length (m) | Duty (kW) | Surface T° (° C.) | Helium T° (° C.) |
|---|---|---|---|---|---|---|---|---|---|---|---|---|---|
| 1st Stage | Cold HEX | Microchannel | 0.177 | 0.200 | 0.5 | 10 | 1.75 | | | 0.04 | −5 | 50 | 55 |
| | Regenerator | Porous Media | 0.177 | 0.200 | 0.81 | | | 53 | 50 | 0.04 | | | |
| | Hot HEX | Microchannel | 0.177 | 0.200 | 0.56 | 7.2 | 1.75 | | | 0.08 | 10 | 371 | 367 |
| Joining Tube | Tube 2 | Tube | | 0.119 | | | | | | 0.15 | | | |
| 2nd Stage | Cold HEX | Microchannel | 0.239 | 0.270 | 0.5 | 10 | 1.75 | | | 0.04 | −8 | 50 | 55 |
| | Regenerator | Porous Media | 0.239 | 0.270 | 0.81 | | | 53 | 50 | 0.04 | | | |
| | Hot HEX | Microchannel | 0.239 | 0.270 | 0.56 | 6.28 | 1.75 | | | 0.1 | 15 | 374 | 367 |
| Joining Tube | Tube 3 | Tube | | 0.139 | | | | | | 0.15 | | | |
| 3rd Stage | Cold HEX | Microchannel | 0.354 | 0.400 | 0.5 | 10 | 1.75 | | | 0.04 | −30 | 44 | 55 |
| | Regenerator | Porous Media | 0.354 | 0.400 | 0.81 | | | 53 | 50 | 0.03 | | | |
| | Hot HEX | Microchannel | 0.354 | 0.400 | 0.72 | 17.8 | 1.75 | | | 0.08 | 35 | 234 | 222 |
| Buffer | Buffer | Tube | | 0.159 | | | | | | 0.15 | | | |
| Final HEX | Hex tampon | Microchannel | 0.354 | 0.400 | 0.5 | 10 | 1.75 | | | 0.04 | | | |

The temperature of the phase changing material cannot exceed a critical temperature T (e.g., 380 C). Heat can be extracted in the first and the second recuperators while maintaining high temperature in the first and second heat exchanger. The available heat is the heat that can be extracted from the flue gases without reaching the dew temperature D (180 C). The properties of the exhaust gases are detailed in Table 2.

TABLE 2

| Exhaust Gases | |
|---|---|
| Exhaust temperature | 495.00° C. |
| Dew temperature | 180.00° C. |
| Density | 0.45 kg/m3 |
| Mass flow rate | 0.21 kg/s |
| Isobaric heat capacity | 1180.00 J/kg · K |
| Available heat | 78.06 kw |

The characteristics and dimensions that do not change for three stages are illustrated in Table 2. The key parameter to achieve the target thermal power is the number of rows or layers in a stage) that changes depending on the heat exchange surface. Reducing the area of the heat exchange surface increases the number of rows or layers in a stage.

vertically. This has the advantage of being able to use standard components and to be able to carry pressurized enclosures but also to reduce conductive heat loss by reducing the thickness between the different parts of the line.

Figure 7B:
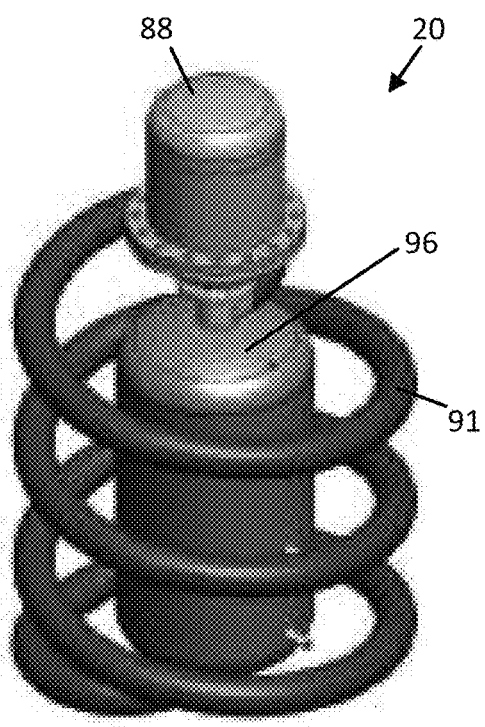
FIG. 7B illustrates an example thermoacoustic system 20 including a bi-direction turbine.

FIG. 7B illustrates a thermoacoustic system 20 including the bi-direction turbine geometry 88 shown in FIG. 6B, a feedback system 91 and a turbine 95. The feedback system 91 may include a spiral tube for recirculating the working gar through the thermoacoustic system 20. The turbine 95 may include a rotor with symmetric blades that are enclosed by two guide vane sets. The shapes of the blades may be selected based on the type of working gas or fluid or the density of the working gas or fluid. The feedback system 91 may be in communication with a receiving system such as the turbine 88 of FIG. 6B.

The turbine may be bidirectional. The performance of (bi-directional) turbines depends, among other parameters, on the density of the working fluid. Thermoacoustic engines may operate at elevated mean pressures up to 40 bars and this elevated gas density may raise turbine efficiency up to 85%. This makes bi-directional turbines a low cost and scalable candidate for converting the generated acoustic power into electricity.

Figure 8:
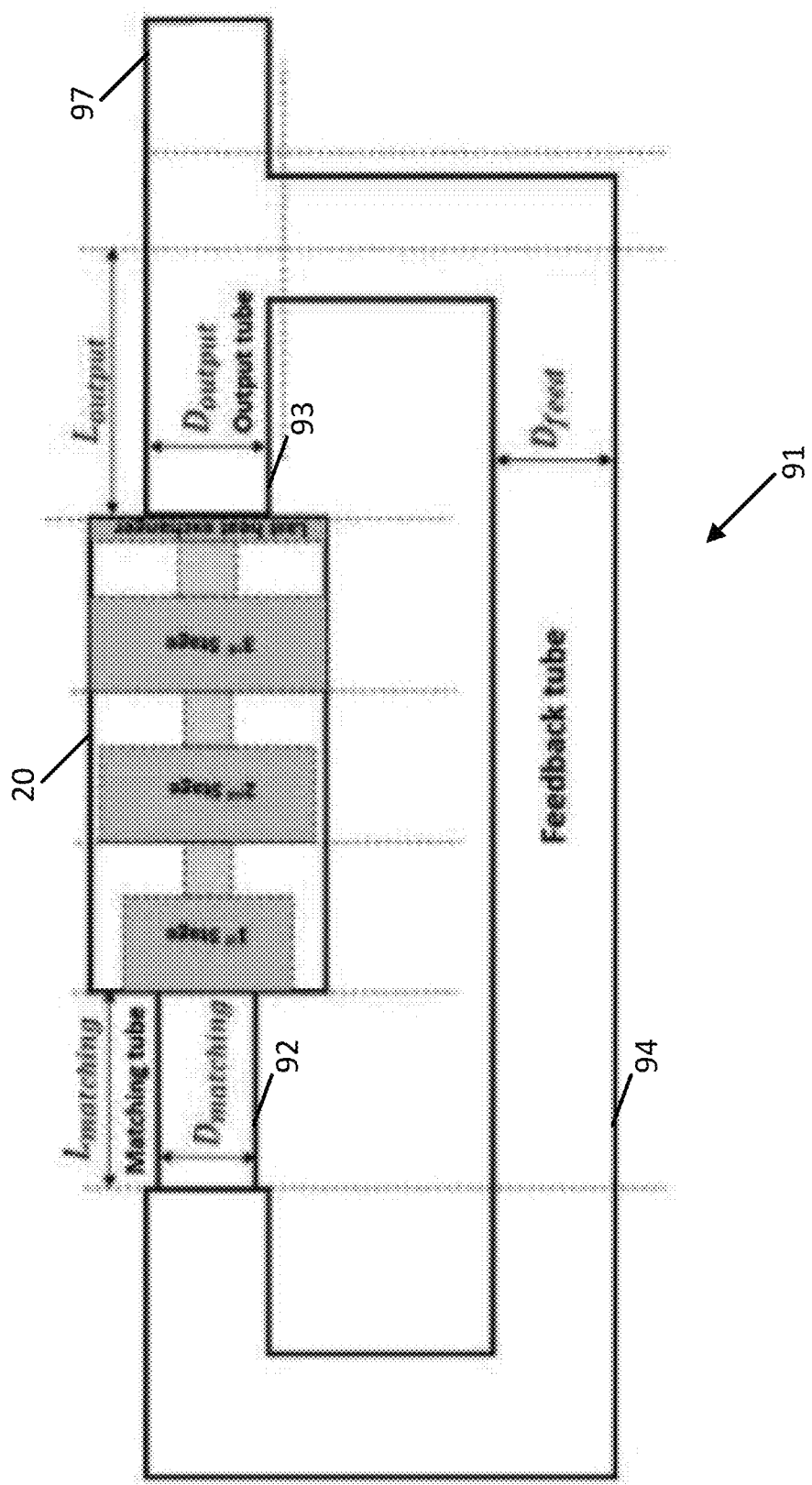
FIG. 8 illustrates an example acoustical retroaction configuration.

FIG. 8 illustrates another feedback system 91 or an acoustical retroaction configuration. The feedback system may include an input tube 92, an output tube 93, and a feedback tube 94. The dimensions of the input tube 92 may be selected to match the thermoacoustic system 20. The dimensions of the input tube 92 may be selected to match the resonant frequency of the thermoacoustic system 20. The output tube 93 connects to the cooling system 60 of the generator 100 and to the feedback tube 94. The feedback tube 94 returns the working gas to the input tube 92 for an additional traversal of the thermoacoustic system 20. An output 97 of the feedback system 91 may be in communication with a receiving system such as the turbine of FIG. 6B.

In one example, the acoustical retroaction configuration that delivers 14 kW of electrical power, when the turbine has an efficiency of 80%. The system may extract 60 kW of thermal flux (77% of the available thermal flux) with an overall thermal efficiency of 24%. The exergetic efficiency of the system may be equal to 41% (Carnot is computed according to the highest temperature (495 C) and lowest temperature (37 C) of the system). Table 5 lists the performance of the acoustical retroaction configuration.

TABLE 5

| $1^{st}$ Stage | Thermal efficiency | 0.42 |
|---|---|---|
| | Viscous factor in the regenerator | 0.71 |
| $2^{nd}$ Stage | Thermal efficiency | 0.47 |
| | Viscous factor in the regenerator | 0.75 |
| $3^{rd}$ Stage | Thermal efficiency | 0.2 |
| | Viscous factor in the regenerator | 0.87 |
| Net acoustic power (kW) | | 17.85 |
| Overall acoustic efficiency | | 0.3 |
| Carnot overall efficiency | | 0.57 |
| Pressure amplitude at the load (kPa) | | 114 |
| Expected electrical power (kW) | | 14.28 |
| Supposed efficiency of the turbine | | 0.80 |
| Overall efficiency | | 0.24 |
| Overall exergetic efficiency | | 0.41 |

Figure 9:
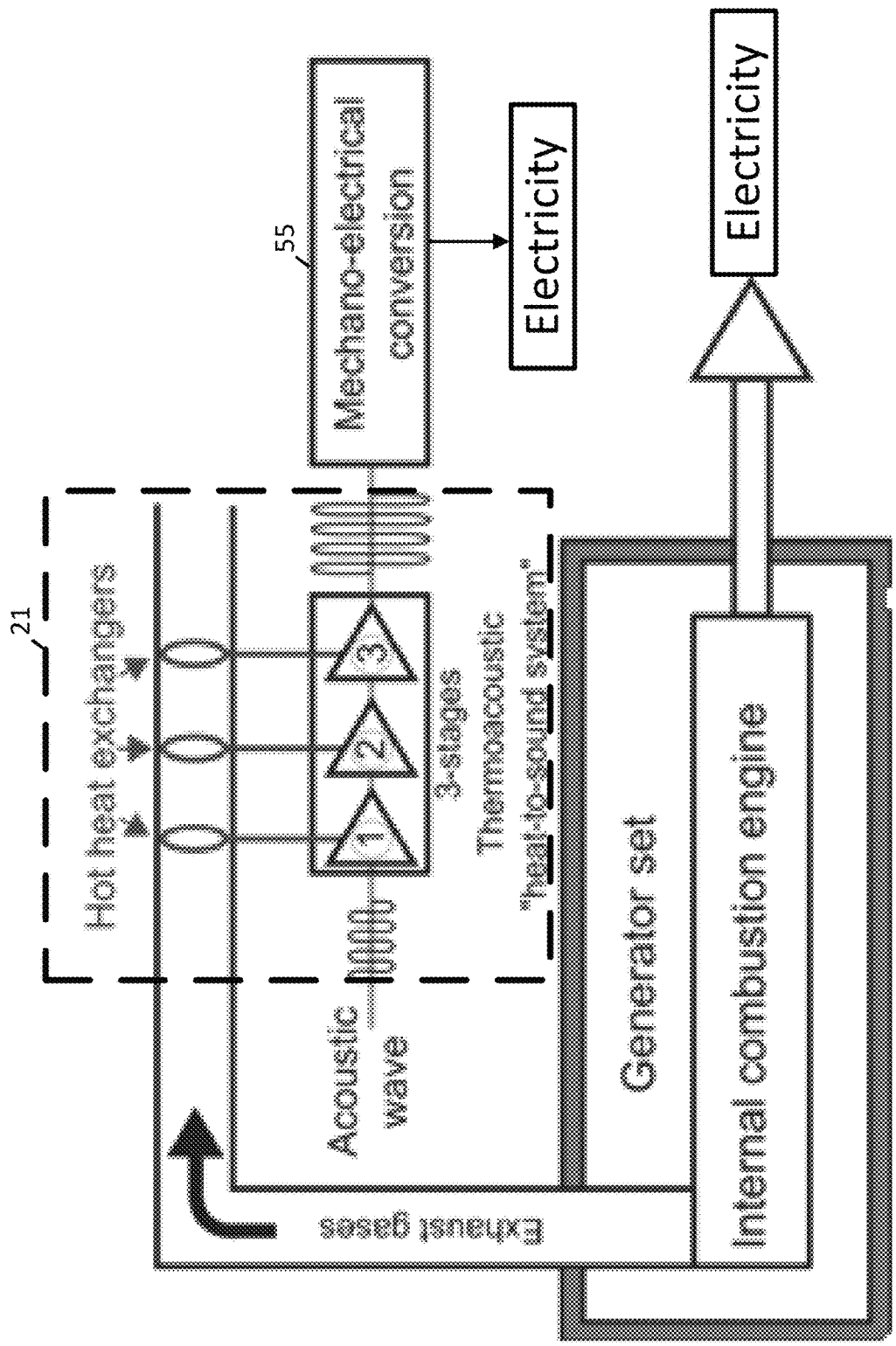
FIG. 9 illustrates another example of an engine and thermoacoustic system.

FIG. 9 is another example of an engine and thermoacoustic system. In this example, the heat to sound system 21 operates similar to the descriptions above, but instead of the sound to cold system 23, the system includes a mechano-electrical conversion system 55 (e.g., turbine). The mechano-electrical conversion system 55 may correspond to the turbine 55 of FIG. 7B and/or the turbine of FIG. 6B.

The mechano-electrical conversion system 55 may be combined with any of the embodiments described herein. The mechano-electrical conversion system 55 may be a turbine such a bidirectional turbine that generates electricity from the amplified acoustic signal. The pressure from the sound waves may rotate a turbine, or oscillate a crankshaft and piston, that rotates a shaft. The rotation may turn a rotor and/or armature winding and generate an electrical output. The electrical output may be used as an additional component of the electrical output of the generator 100. The electrical output may be converted to direct current, which may power an auxiliary system of the generator 100. An example auxiliary system is the control panel or a display for the generator 100. The electrical output may drive an exciter or field winding for the generator 100.

Figure 10:
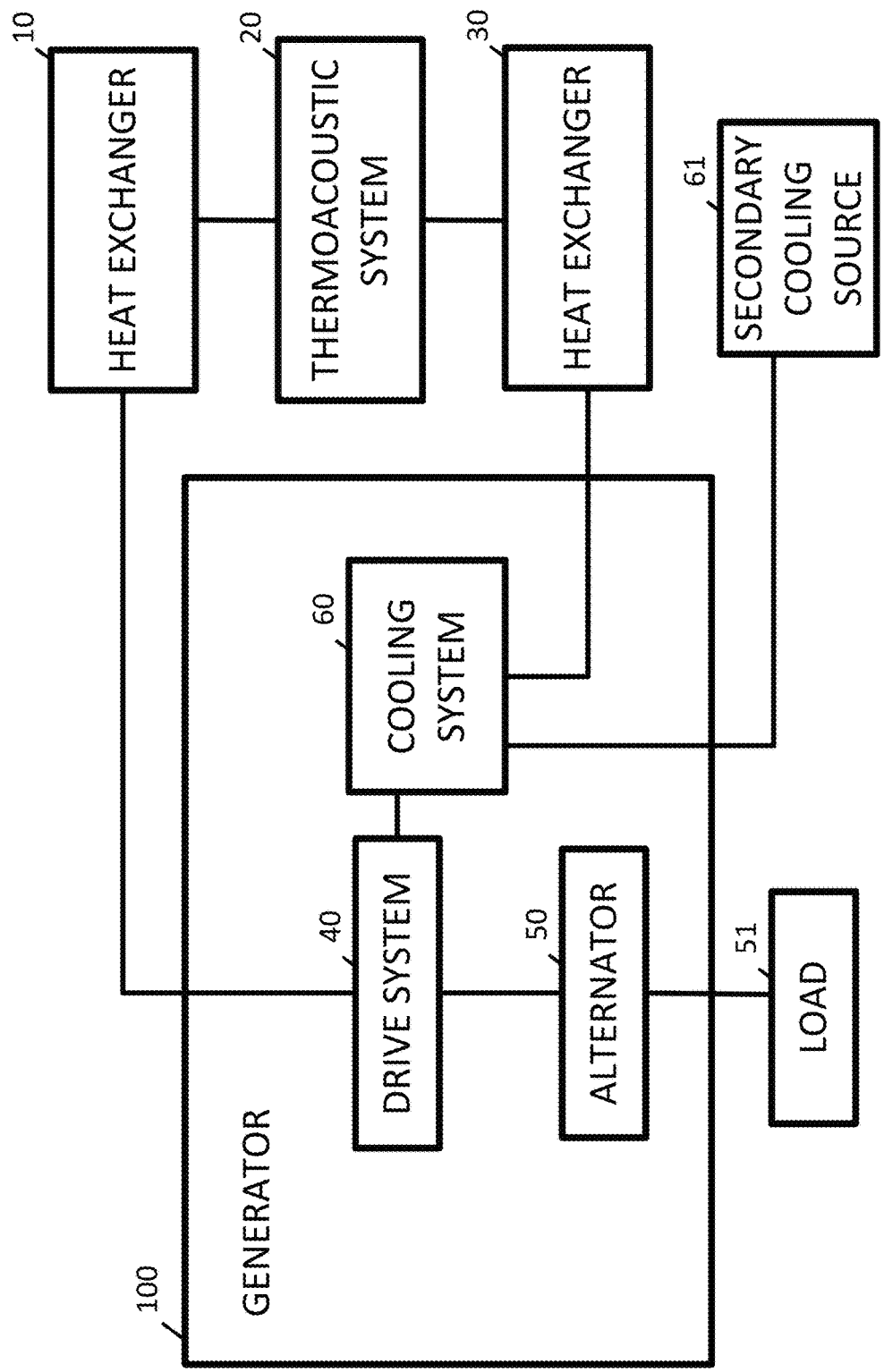
FIG. 10 illustrates an example engine and thermoacoustic system.

FIG. 10 is another illustration of an engine and thermoacoustic system. In addition, to the cooling affect provided by the heat exchanger 30 from the thermoacoustic system 20, the system include a secondary cooling source 61. The secondary cooling source 61 may be necessary because of the time that may be required for the thermoacoustic system 20 to reach steady state. In addition, the second cooling source 61 may supplement the primary cooling of the thermoacoustic system when conditions are inefficient or additional cooling is required.

Figure 11:
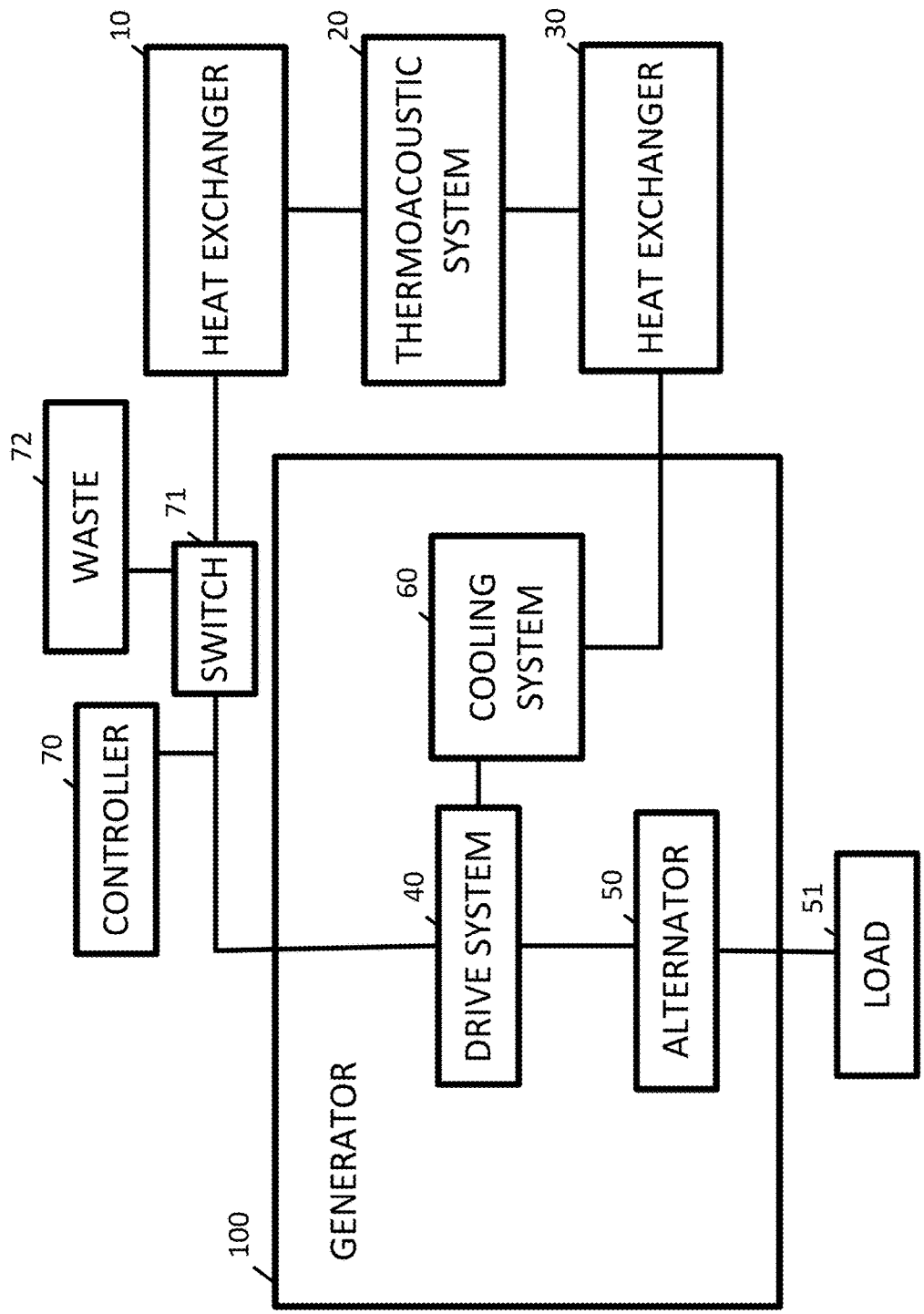
FIG. 11 illustrates an example drive system and thermoacoustic system.

FIG. 11 is another illustration of a drive system and thermoacoustic system. The system of FIG. 11 includes a controller 70 and switch 71. The controller 70 may include a thermometer or thermistor to monitor the temperature of the exhaust gas. The controller 70 may control switch 71 to activate or deactivate the thermoacoustic system. The switch 71 may include a mechanical valve that controls the flow of exhaust variably from the drive system 40 to the heat exchanger 10 or to the waste system 72. The switch 71 may include an electrical switch that turns on and off the acoustic source.

In one example, the controller 71 may compare the temperature of the exhaust gas to one or more thresholds. The thermoacoustic system may be operated at only at a predetermined temperature range. In another example, the amount of exhaust may be diverted to the thermoacoustic system may be a function of temperature. For example, the drive system 40 may begin running at a lower temperature, when the exhaust gas reaches the temperature threshold, the controller 70 and switch 71 switch the exhaust from the waste system 72 to the heat exchanger 10, and ultimately to the thermoacoustic system 20. In another example, the controller 70 may identify when the exhaust temperature becomes too high and may cause damage to the heat exchanger 10 or thermoacoustic system 20. In another example, the temperature is measured at another portion of the generator 100 such as the alternator 50. The temperature of the alternator 50 may be calculated based on a resistance measurement in the coils of the alternator 50 or calculated based on output or load on the alternator 50.

In one example, the controller 71 is physically coupled to the generator 100. The controller 71 may be included in a control panel mounted on or near the generator 100. In another example, the controller 71 is remote to the generator 100 and the controller 71 remotely monitors the generator 100, the drive system 40, the thermoacoustic system 20, the cooling system 60, or the exhaust. For example, the generator 100 may be located in a facility (e.g., factory, marine ship) and the controller 71 is located in a control room or a control facility. To facilitate communication, the generator 100 may include a communication device or interface. Communication between the controller 71 and the generator may be wired or wireless. The communication interface of the generator 100 may be associated with an internet protocol address and communication is made through the internet. The communication interface of the generator 100 and the controller 71 may be configured for communication using the family of protocols known as Bluetooth, the family of protocols known as 802.11, cellular communication, or another wireless communication.

In addition or in the alternative to input data from generator 100, the drive system 40, the thermoacoustic system 20, the cooling system 60, and/or the exhaust, the controller 71 may also receive additional inputs from one or more users. The user input may provide commands for fully or partially switching the exhaust from the waste 72 to the thermoacoustic system 20. The user input may specify a mode for operating the thermoacoustic system 20 or the switch 71. The mode may be an efficiency mode that optimizes the degree the exhaust is channeled to the thermoacoustic system 20. The mode may be an efficiency mode that selects the most efficient times to switch the exhaust to the thermoacoustic system 20.

Additionally or alternatively, the controller 71 may locally monitor or remotely monitor external input parameters for the purposes of partially of fully switching the exhaust from the waste 72 to the thermoacoustic system 20. The external input parameters may include properties of a utility system connected to the generator 100. The properties of the utility system may include whether or not the utility is supplying electricity to a system including the generator 100, a degree to which electricity is applied, a cost of the electricity at a current time, a power factor at a current time, or another properties. Commands for controller 71 may also be received directly from the utility system. The controller 71 may determine whether or not to connect the thermoacoustic system 20 based on the utility properties.

Figure 12:
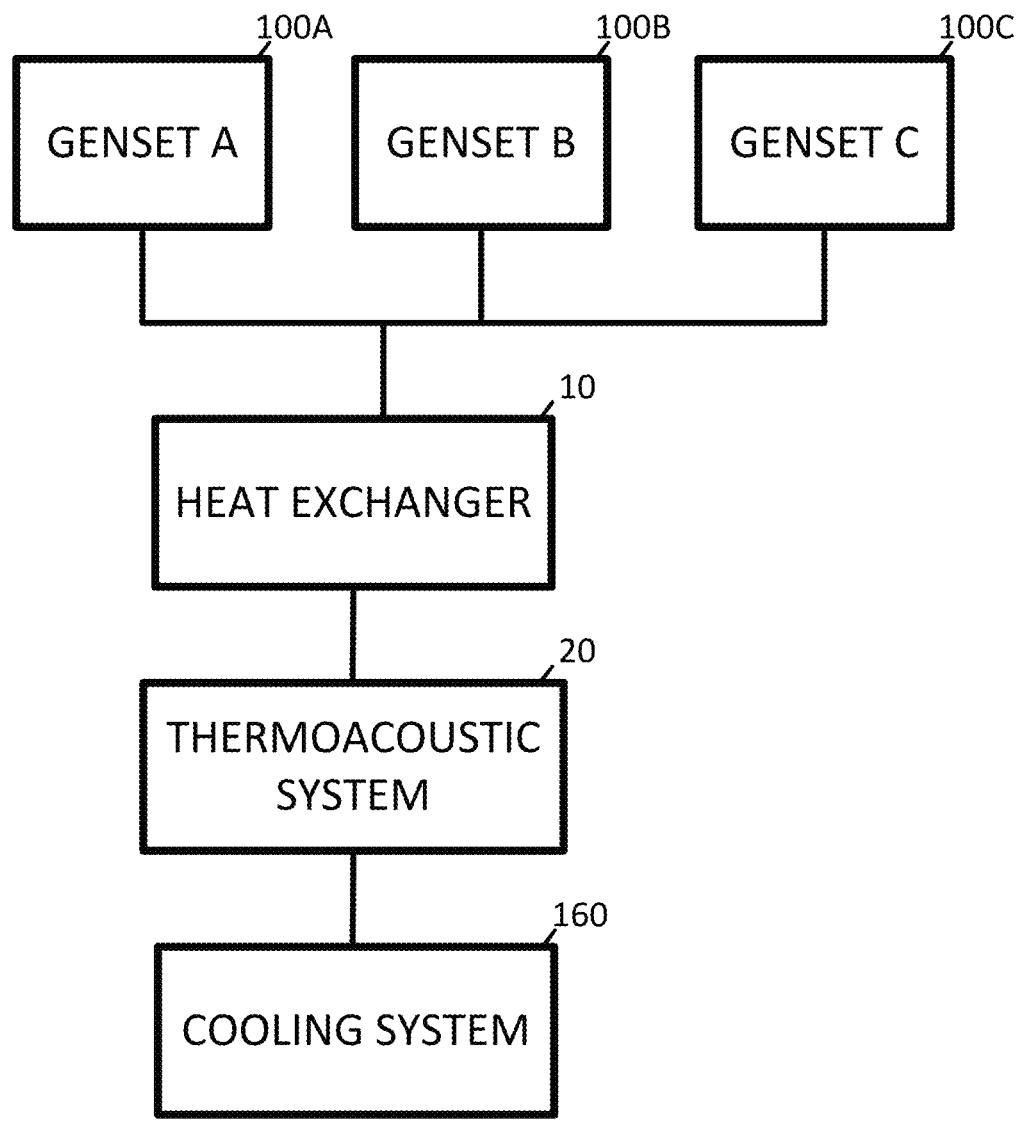
FIG. 12 illustrates an example group of gensets.

FIG. 12 illustrates multiple gensets 100A-C. The gensets 100A-C may be connected to a common bus to supply power to a common load. The gensets 100A-C may be synchronized or paralleled. The gensets 100A-C may share a thermoacoustic system. For example, the exhaust lines of the gensets 100A-C may be physically connected to the heat exchanger 10, thermoacoustic system 20, and a cooling system 160 described above. The cooling system 160 may cool one, some or all of the engines of the gensets 100A-C. In one example, different combinations of the gensets 100A-C are connected by the controller 70 and switch 71 as a function of temperature. In addition or alternatively, the controller 70 may selectively control which gensets 100A-C are cooled by the cooling system 160. Additional components of the drive system 40 may include a manifold, one or more cylinders, a fuel supply, a speed governor, a lubrication system, and a starter. The switch 71 may turn on and off the input acoustic source 25 to coincide with exhaust gas being diverted to the thermoacoustic system. As described in examples above, the controller 70 may selectively connect and disconnect the thermoacoustic system 20 the gensets 100A-C in varying degrees according to one or more inputs including but not limited to, remote commands, utility properties, user commands, and sensor measurements.

In addition, the controller 70 and a switch array may independent connect and disconnect the gensets 100A-C. That is, one or more of the gensets 100A-C may be connected to the thermoacoustic system 20 at that the same time one or more other gensets 100A-C are not connected. The pattern of connections may be based on individual measurements made at the gensets 100A-C or specific commands received for individual gensets. In one example, the thermoacoustic system 20 may be connected to one of the gensets 100A-C that can most benefit from the thermoacoustic system 20. For example, the switch array may connect only the genset with the highest exhaust temperature.

Figure 13:
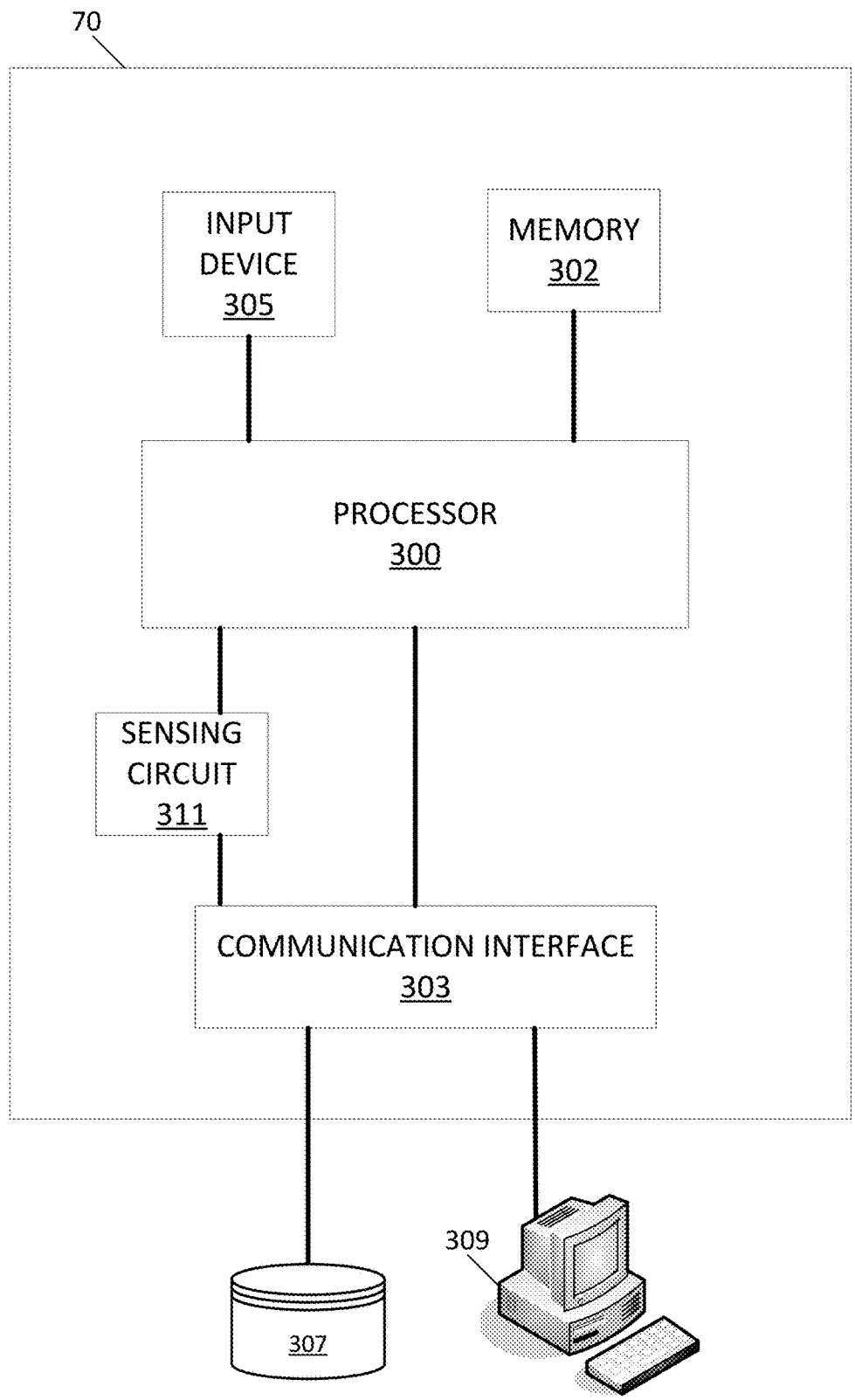
FIG. 13 illustrates an example controller for any of the above systems.

As illustrated by FIG. 13, the controller 70 may include includes a processor 300, an input device 305, a communication interface 303, a memory 302, and a display. The display may be integrated with the computing device or supplied by workstation 309. The database 307 may include settings for the thermoacoustic system 20. Additional, different, or fewer components may be included.

The sensing circuit 311 may be a thermometer or thermometer as described above. The processor 300 may control the switch 71 or another aspect of the thermoacoustic system 20 as a function of the output of the sensing circuit 311. Other types of sensor for the sensing circuit 311 gas sensors, motion sensors, temperature sensors, pressure sensors, and internal engine sensors. Example gas sensors may include one or more of oxygen sensor, carbon dioxide sensor, carbon monoxide, or an emission sensor. The processor 300 may control the switch 71 or the thermoacoustic system 20 based on the output of any of these sensors.

The processor 300 may include a general processor, digital signal processor, an application specific integrated circuit (ASIC), field programmable gate array (FPGA), analog circuit, digital circuit, combinations thereof, or other now known or later developed processor. The memory 302 may be a volatile memory or a non-volatile memory. The memories may include one or more of a read only memory (ROM), random access memory (RAM), a flash memory, an electronic erasable program read only memory (EEPROM), or other type of memory. The memory 201 may be removable from the controller 302, and the memory 15 may be removable from the engine, such as a secure digital (SD) memory card.

The communication interface 303 may include a physical interface, an electrical interface, and/or a data interface. The communication interface 303 provides for wireless and/or wired communications in any now known or later developed format. In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 303 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

Any of the techniques described above may be embodied on a non-transitory computer readable medium, which may be a single medium or multiple media, such as a centralized or distributed database, and/or associated caches and servers that store one or more sets of instructions. The term "non-transitory computer-readable medium" shall also include any medium, except a signal per se, that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

I claim:

1. An internal combustion engine comprising:
one or more cylinders;
an exhaust system;
a cooling system, which cools intake air admitted in said one or more cylinders of the internal combustion engine;
a first thermoacoustic device configured to convert heat energy from the exhaust system to amplify an acoustic wave; and
a second thermoacoustic device configured to convert energy in the amplified acoustic wave to an input for the cooling system.

2. The internal combustion engine of claim 1, wherein the first thermoacoustic device includes at least one heat to sound amplifier in thermal connection to at least one heat exchanger of the exhaust system.

3. The internal combustion engine of claim 2, wherein at least one heat exchanger includes a radiator.

4. The internal combustion engine of claim 1, wherein the heat to sound amplifier includes a stack of parallel plates of porous material.

5. The internal combustion engine of claim 1, wherein the second thermoacoustic device includes a sound to cold system.

6. The internal combustion engine of claim 1, further comprising:
a transfer medium between the first thermoacoustic device and the second thermoacoustic device.

7. The internal combustion engine of claim 6, wherein the transfer medium includes a noble gas.

8. The internal combustion engine of claim 1, wherein the first thermoacoustic device include a plurality of thermoacoustic stages.

9. A generator comprising:
a drive system comprising an internal combustion engine comprising one or more cylinders;
an alternator driven by the drive system;
an exhaust system;
a cooling system, which cools intake air admitted in said one or more cylinders of the internal combustion engine;
a first thermoacoustic device configured to convert heat energy from the exhaust system to amplify an acoustic wave; and
a second thermoacoustic device configured to convert energy in the amplified acoustic wave to an input for the cooling system.

10. The generator of claim 9, wherein the first thermoacoustic device includes at least one heat to sound amplifier in thermal connection to at least one heat exchanger of the exhaust system.

11. The generator of claim 9, wherein the second thermoacoustic device includes a sound to cold system.

12. The generator of claim 9, further comprising:
a transfer medium between the first thermoacoustic device and the second thermoacoustic device.

13. The generator of claim 9, wherein the first thermoacoustic device include a plurality of thermoacoustic stages.

14. A set of generators comprising:
a drive system comprising a set of internal combustion engines;
an alternator driven by the drive system;
an exhaust system for the set of generators;
a cooling system for the set of generators, which cools intake air admitted in one or more cylinders of the internal combustion engines;
a first thermoacoustic device configured to convert heat energy from the exhaust system to amplify an acoustic wave; and
a second thermoacoustic device configured to convert energy in the amplified acoustic wave to an input for the cooling system.

* * * * *